United States Patent [19]
Papworth et al.

[11] Patent Number: 6,079,014
[45] Date of Patent: Jun. 20, 2000

[54] PROCESSOR THAT REDIRECTS AN INSTRUCTION FETCH PIPELINE IMMEDIATELY UPON DETECTION OF A MISPREDICTED BRANCH WHILE COMMITTING PRIOR INSTRUCTIONS TO AN ARCHITECTURAL STATE

[75] Inventors: David B. Papworth, Beaverton; Michael A. Fetterman; Andrew F. Glew, both of Hillsboro; Robert P. Colwell; Glenn J. Hinton, both of Portland, all of Oreg.

[73] Assignee: Intel Corporation, Santa Clara, Calif.

[21] Appl. No.: 08/921,852

[22] Filed: Sep. 2, 1997

Related U.S. Application Data

[63] Continuation of application No. 08/692,611, Aug. 6, 1996, abandoned, which is a continuation of application No. 08/441,261, May 15, 1995, abandoned, which is a continuation of application No. 08/161,238, Dec. 2, 1993, abandoned.

[51] Int. Cl.[7] .................................................. G06F 9/00
[52] U.S. Cl. ......................... 712/233; 712/1; 712/200; 712/239
[58] Field of Search ............................. 712/200, 233, 712/239, 1

[56] References Cited

U.S. PATENT DOCUMENTS

| | | | |
|---|---|---|---|
| 4,200,927 | 4/1980 | Hughes et al. | 395/375 |
| 4,498,136 | 2/1985 | Sproul, III | 395/375 |
| 4,752,873 | 6/1988 | Shonai et al. | 395/800 |
| 4,807,115 | 2/1989 | Torng | 395/375 |
| 5,067,069 | 11/1991 | Fite et al. | 395/375 |
| 5,136,697 | 8/1992 | Johnson | 395/375 |
| 5,222,244 | 6/1993 | Carbine et al. | 395/800 |
| 5,287,465 | 2/1994 | Kurosawa et al. | 275/375 |
| 5,361,337 | 11/1994 | Okin | 395/375 |
| 5,519,841 | 5/1996 | Sager et al. | 395/412 |
| 5,548,776 | 8/1996 | Colwell et al. | 395/800 |
| 5,564,056 | 10/1996 | Fetterman et al. | 395/800 |
| 5,564,118 | 10/1996 | Steely, Jr. et al. | 395/375 |

OTHER PUBLICATIONS

Mike Johnson, "Superscalar Microprocessor Design", Prentice Hall, 1991.

*Primary Examiner*—Zarni Maung
*Assistant Examiner*—Saleh Najjar
*Attorney, Agent, or Firm*—Blakely, Sokoloff, Taylor & Zafman LLP

[57] ABSTRACT

A processor is disclosed comprising a front end circuit that fetches a series of instructions according to a program sequence determined by at least one branch prediction, a register renaming circuit that allocates execution resources to each instruction, and an execution circuit that executes each instruction in the instruction stream. The execution circuit causes the front end circuit to refetch the series of instructions if a branch misprediction is detected. A stall signal disables the register renaming circuit until the execution circuit commits the branch result to an architectural state according to the program sequence.

23 Claims, 9 Drawing Sheets

PROCESSOR THAT REDIRECTS AN INSTRUCTION FETCH PIPELINE IMMEDIATELY UPON DETECTION OF A MISPREDICTED BRANCH WHILE COMMITTING PRIOR INSTRUCTIONS TO AN ARCHITECTURAL STATE

This is a continuation of application Ser. No. 08/692,611, filed Aug. 6, 1996, now abandoned, which is a continuation of application Ser. No. 08/441,261, filed May 15, 1995 now abandoned, which is a continuation of application Ser. No. 08/161,238 filed Dec. 2, 1993, now abandoned.

BACKGROUND OF THE INVENTION

1. Field of the Invention

The present invention pertains to the field of computer systems. More particularly, this invention relates to a mechanism for stalling an in-order instruction fetch pipeline during instruction stream repairs in an a processor performing speculative out-of-order instruction execution.

2. Background

Typical prior computer processors implement in-order instruction execution pipelines. An in-order processor usually fetches an instruction stream from a memory, and executes each instruction in the instruction stream according to a sequential program order. Such in-order instruction execution ensures that data dependencies among the instructions are strictly observed.

A processor may perform out-of-order instruction execution to increase instruction execution performance. Such a processor executes ready instructions in the instruction stream ahead of earlier instructions in the program order that are not ready. A ready instruction is typically an instruction having fully assembled source data and available execution resources.

Such out-of-order execution improves processor performance because the instruction execution pipeline of the processor does not stall while assembling source data or execution resources for a non ready instruction. For example, a non ready instruction awaiting source data from an external memory fetch does not stall the execution of later instructions in the instruction stream that are ready to execute.

A processor may also perform speculative instruction execution to increase instruction execution performance. Such a processor typically determines a speculative execution path through a program by predicting the result of branch instructions. Such a processor fetches an instruction stream from a memory, predicts a branch result for each branch instruction, and continues fetching and executing the instruction stream according to the predicted branch result. Such speculative execution increases processor performance because the instruction fetch and execution pipeline does not stall during the resolution of branch instructions.

A processor that performs both speculative and out-of-order instruction execution generates speculative result data in an out-of-order sequence in relation to the original program order. The result data is out-of-order because the instructions that cause generation of the result data are executed out-of-order. The result data is speculative until the branch predictions that caused speculative execution of the instructions are resolved.

A processor that performs speculative instruction execution typically fetches an instruction stream down an incorrect program path if a branch instruction is mispredicted. As a consequence, the internal registers and execution resources of such processors become corrupted with invalid instructions and result data. Such processors require a mechanism for removing the invalid instructions and invalid result data, and for redirecting the instruction stream to the proper program path after a branch misprediction.

Prior processors that perform speculative execution typically employ multiple sets of internal registers to hold speculative information for each branch prediction. Such a processor allocates one the internal register sets to each speculative execution path. The invalid instructions and result data for a mispredicted branch are removed by clearing the corresponding internal register set and switching to an internal register set for the program path prior to the mispredicted branch.

Unfortunately, the implementation of multiple sets of internal registers increases manufacturing costs for such processors because each register set increases the integrated circuit die space for the processor. As a consequence, such processors are typically limited to a small number of internal register sets, thereby limiting the number of program nesting levels that can be speculated.

SUMMARY AND OBJECTS OF THE INVENTION

One object of the present invention is to enable recovery from a branch misprediction in a processor performing speculative out-of-order instruction execution.

Another object of the present invention is to enable recovery from a branch misprediction in a processor performing speculative out-of-order instruction execution by redirecting an instruction fetch pipeline immediately upon detection of a mispredicted branch.

Another object of the present invention is to enable recovery from a branch misprediction in a processor performing speculative out-of-order instruction execution by stalling the instruction stream from entering the execution pipeline while completing execution of instructions fetched prior to the mispredicted branch.

A further object of the present invention is to enable recovery from a branch misprediction by enabling entry of the redirected instruction stream into the execution pipeline after discarding the instructions fetched after the mispredicted branch.

These and other objects of the invention are provided by a processor comprising a front end circuit that fetches a series of instructions according to a program sequence determined by at least one branch prediction. The series of instructions includes a branch instruction corresponding to the branch prediction. The processor further comprises a register renaming circuit. The register renaming circuit generates a physical instruction stream by receiving the series of instructions from the front end circuit and allocating at least one execution resource to each instruction.

The processor further comprises an execution circuit that receives the physical instruction stream from the register renaming circuit, and that executes each instruction in the physical instruction stream. The execution of the branch instruction by the execution circuit generates a branch result. The execution circuit generates a clear signal if the branch prediction does not match the branch result. The clear signal causes the front end circuit to refetch the series of instructions according to the branch result.

The processor further comprises a control circuit that senses the clear signal from the execution circuit, and that asserts a stall signal to disable the register renaming circuit and prevent the refetched series of instructions from entering the execution circuit. The control circuit then causes the execution circuit to commit the branch result to an architectural state according to the program sequence. The control circuit then generates an execution clear signal to reset the execution circuit, and deasserts the stall signal to enable the execution circuit to receive the physical instruction stream for the refetched series of instructions.

Other objects, features and advantages of the present invention will be apparent from the accompanying drawings, and from the detailed description that follows below.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Figure 1:
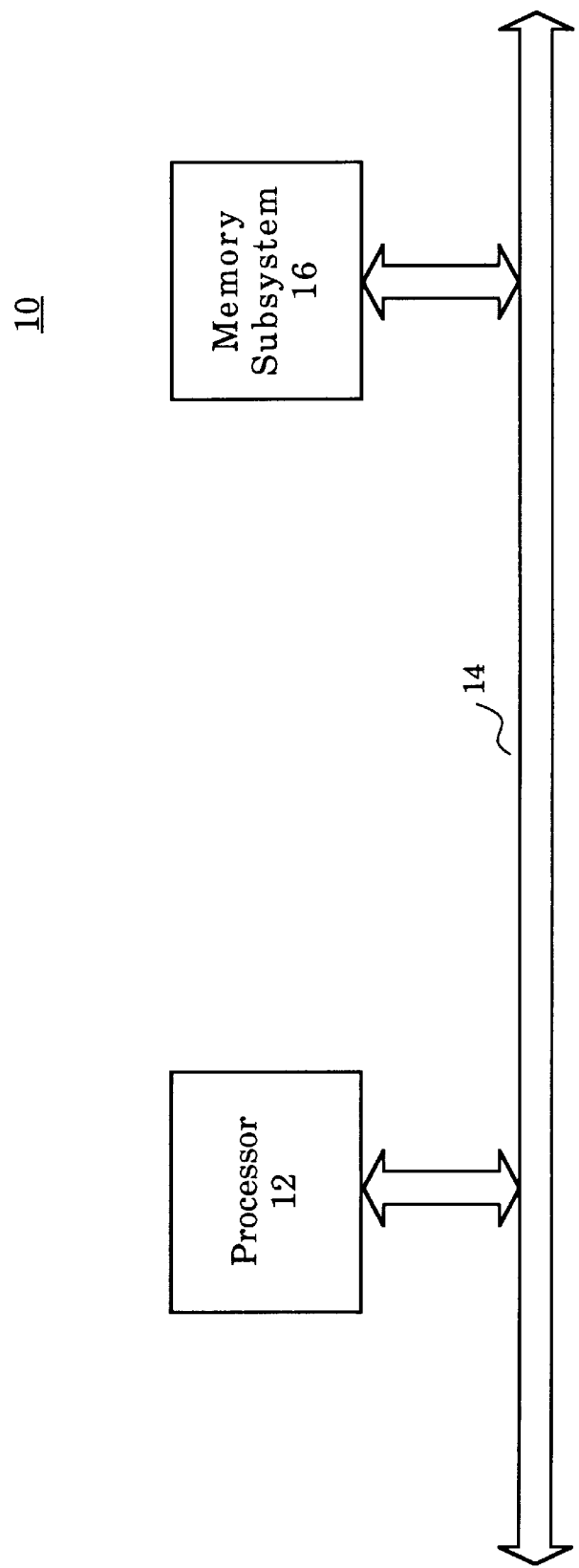
FIG. 1 illustrates a computer system comprising a processor, and a memory subsystem.

FIG. 1 illustrates a computer system 10. The computer system 10 comprises a processor 12 and a memory subsystem 16. The processor 12 and the memory subsystem 16 communicate over a host bus 14.

The processor 12 fetches a stream of instructions from the memory subsystem 16 over the host bus 14 through the cache circuit 24. The processor 12 executes the stream of instructions and maintains data storage in the memory subsystem 16.

Figure 2:
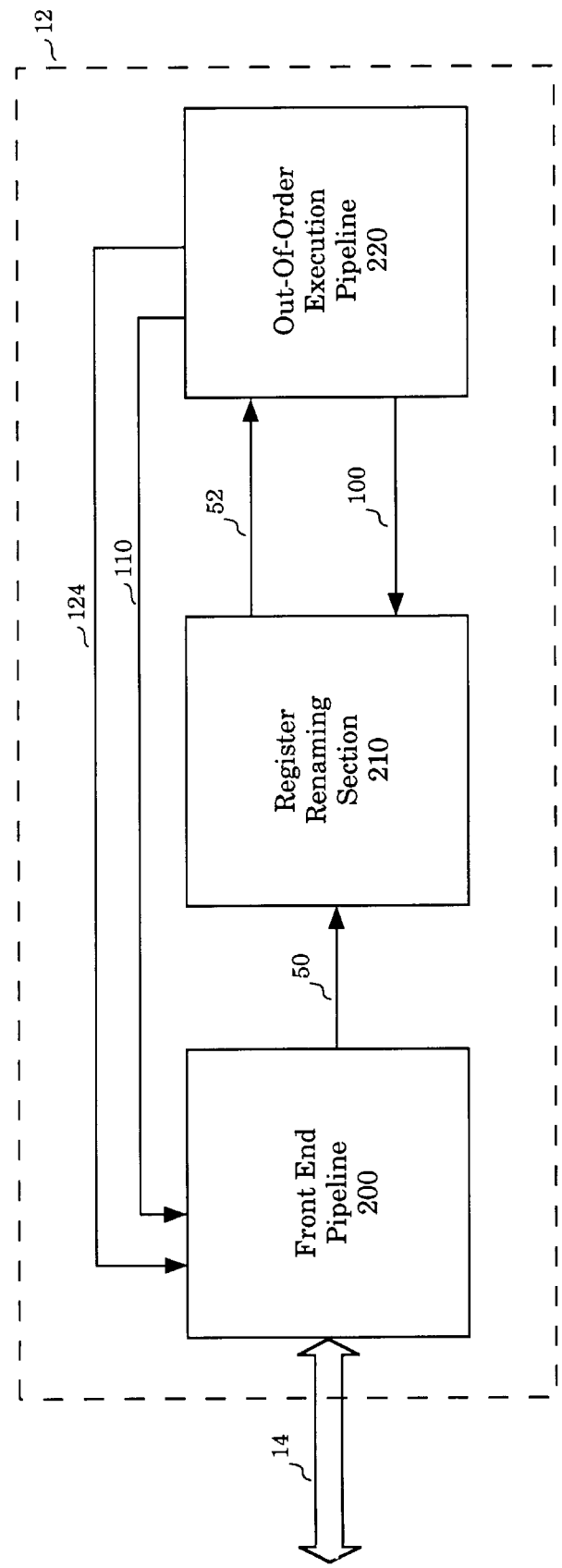
FIG. 2 is a block diagram of a processor for one embodiment wherein the processor comprises a front end pipeline, a register renaming section, and an out-of-order execution pipeline.

FIG. 2 illustrates the processor 12 for one embodiment. The processor 12 comprises a front end pipeline 200, a register renaming section 210, and an out-of-order execution pipeline 220.

The front end pipeline 200 fetches instructions over the host bus 14, performs speculative branch prediction for the instructions, and issues an in-order stream of logical micro operations, hereinafter referred to as logical micro-ops. The front end pipeline 200 generates one or more logical micro ops for each instruction fetched from the memory subsystem 16. The front end pipeline 200 transfers the in-order stream of logical micro-ops over a logical micro-op bus 50.

For one embodiment, the instructions fetched by the front end pipeline 200 comprise Intel Architecture Microprocessor instructions. The Intel Architecture Microprocessor instructions operate on a set of architectural registers, including an EAX register, an EBX register, an ECX register, and an EDX register, etc, as well as floating-point registers.

The logical micro-ops issued by the front end pipeline 200 are micro operations that perform the function of the corresponding instruction. The logical micro-ops specify arithmetic and logical operations as well as load and store operations to the memory subsystem 16.

The register renaming section 210 receives the in-order logical micro-ops over the logical micro-op bus 50, and generates a corresponding set of in-order physical micro-ops by renaming the logical register sources and destinations of the logical micro-ops. The register renaming section 210 tracks the available resources in the out-of-order execution pipeline 220, and assigns the available resources to the physical micro-ops.

The register renaming section 210 maps the register logical sources and the register logical destination of each logical micro-op into physical register sources and a physical destination, and transfers the in-order physical micro-ops over a physical micro-op bus 52. The register physical sources of the physical micro-ops specify physical registers contained in the out-of-order pipeline 220 that buffer speculative data and committed state registers in the out-of-order pipeline 220 that buffer committed architectural state data.

The out-of-order execution pipeline 220 receives the in-order physical micro-ops over the physical micro-op bus 52, executes the physical micro-ops according to the availability of speculative source data and execution resources, and buffers the speculative result data from such out-of-order execution. The out-of-order execution pipeline 220 retires the speculative result data to an architectural state in the same order as the corresponding physical micro-ops are issued by the front end pipeline 200.

The out-of-order execution pipeline 220 verifies the branch predictions of the front end pipeline 200 as each branch instruction is executed. The out-of-order execution pipeline 220 issues a jump execution clear signal 110 to the front end pipeline 200 if a mispredicted branch is detected during execution of a branch instruction. The out-of-order execution pipeline 220 specifies a correct target address for the mispredicted branch using a target address bus 124.

The out-of-order execution pipeline 220 also issues rename stall signal over a reorder control bus 100 if a mispredicted branch is detected during execution of a branch instruction. The rename stall signal on the reorder control bus 100 causes the register renaming section 210 to disable the flow of micro-ops into the out-of-order execution pipeline 220. The rename stall signal prevents execution of micro-ops generated by the mispredicted branch.

The jump execution clear signal 110 causes the front end pipeline 200 to restart the in-order stream of logical micro-ops. The front end pipeline 200 restarts the logical micro-op stream according to the target address specified on the target address bus 124, and transfers a new in-order stream of logical micro-ops over the logical micro-op bus 50.

While the front end pipeline 200 restarts the logical micro-op stream, the out-of-order execution pipeline 220 continues to execute the physical micro-ops. The physical micro-ops that entered the out-of-order execution pipeline 220 before the register renaming section 210 was disabled by the rename stall signal are executed out-of-order until the mispredicted branch retires to the architectural state. The out-of-order execution pipeline 220 then issues a reorder clear signal over the reorder control bus 100 and removes the rename stall signal.

The reorder clear signal clears the speculative result data in the out-of-order execution pipeline 220, and clears the physical micro-ops awaiting execution in the out-of-order execution pipeline 220. The reorder clear signal also resets the register renaming section 210 to an appropriate state to receive and process the new in-order stream of logical micro-ops on the logical micro-op bus 50 from the front end pipeline 200.

Figure 3:
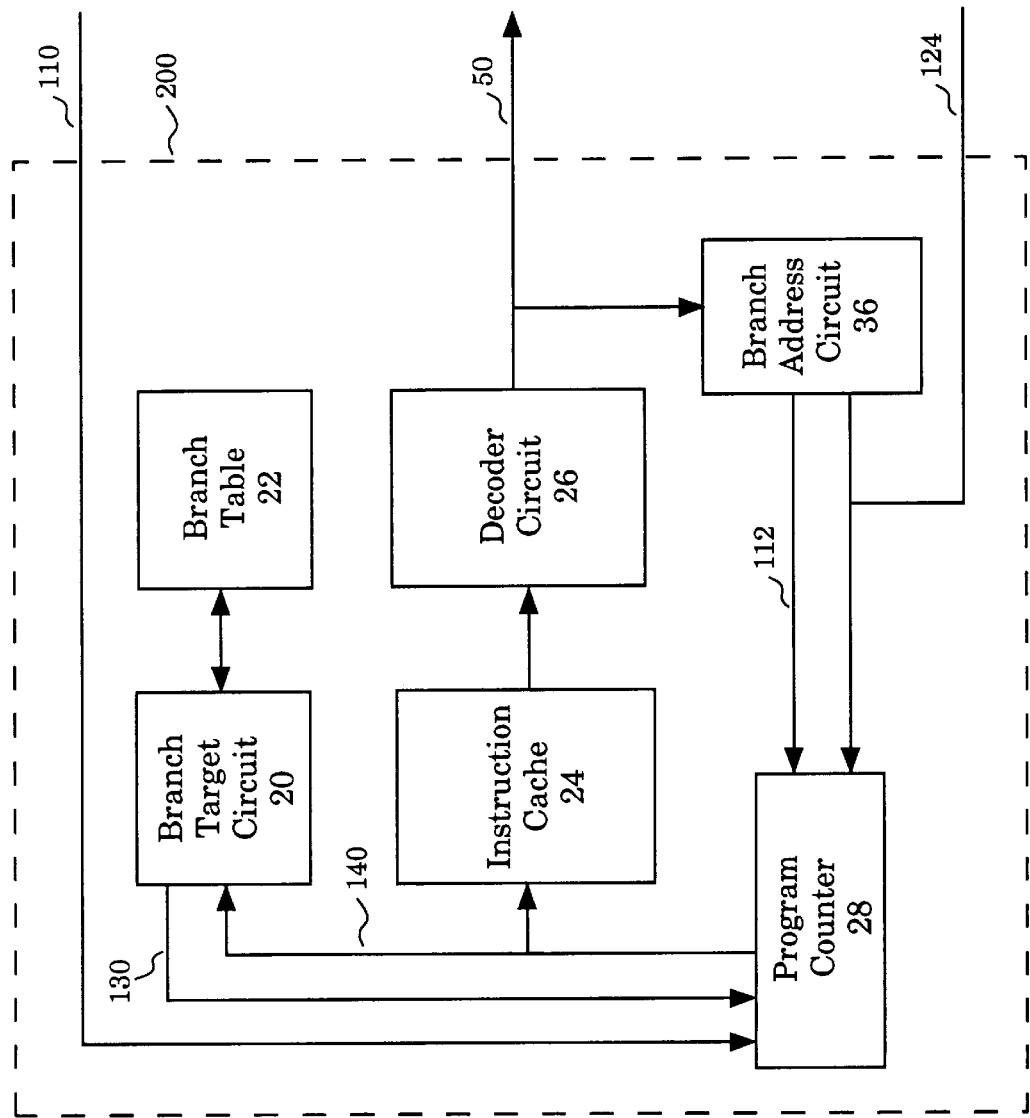
FIG. 3 illustrates the front end pipeline which comprises an instruction cache, a program counter circuit, a decode circuit, a branch target circuit, a branch table, and a branch address circuit.

FIG. 3 illustrates the front end pipeline 200 for one embodiment. The front end pipeline 200 comprises an instruction cache 24, a program counter circuit 28, a decode circuit 26, a branch target circuit 20, a branch table 22, and a branch address circuit 36. The instruction cache 24 buffers instructions fetched from the memory subsystem 16 over the host bus 14. The instruction cache 24 interfaces to the host bus 14 through a bus interface circuit (not shown).

The program counter circuit 28 controls the sequence of instruction flow from the instruction cache 24. The program counter circuit 28 transfers instruction addresses over a program counter bus 140. The instruction addresses cause the instruction cache 24 to transfer a stream of instructions to the decoder circuit 26.

The branch target circuit 20 predicts the branches in the stream of instructions accessed from the instruction cache 24. The branch target circuit 20 receives the instruction addresses on the program counter bus 140, and generates predicted target addresses based upon the instruction addresses. The branch target circuit 20 transfers the predicted target addresses to the program counter circuit 28 over a branch target bus 130.

The branch target circuit 20 logs fall through instruction addresses in the branch table 22. The fall through instruction addresses indicate a next sequential instruction address for each predicted target address generated by the branch target circuit 20. The fall through instruction addresses are used to redirect the front end pipeline 200 to the correct instruction if the branch target circuit 20 erroneously causes a branch.

The decoder circuit 26 converts the instructions from the instruction cache 24 into an in-order stream of logical micro-ops. The decoder circuit 26 generates one or more logical micro ops for each instruction from the instruction cache 24.

The decoder circuit 26 transfers the in-order stream of logical micro-ops over the logical micro-op bus 50. For one embodiment, the decoder circuit 26 issues up to four in-order logical micro-ops during each clock cycle of the processor 12.

Each logical micro-op on the logical micro-op bus 50 comprises an opcode, a pair of logical sources and a logical destination. The opcode specifies a function for the logical micro-op. The opcode includes a branch taken flag that indicates whether the original instruction corresponding to logical micro-op caused the branch target circuit 20 to take a branch.

Each logical source may specify a register or provide an immediate data value. The register logical sources and the logical destinations of the logical micro-ops correspond to the architectural registers of the original instructions.

If a logical micro-op specifies a branch, then one of the logical sources carries immediate data that indicates the predicted target address for the branch. The predicted target address is employed in the out-of-order execution pipeline 220 to verify the branch target address prediction.

The branch address circuit 36 verifies branch predictions for unconditional relative branch micro-ops. The branch address circuit 36 receives each micro-ops on the logical micro-op bus 50, decodes the opcode, and tests the corresponding branch taken flag to verify the branch prediction if the opcode specifies an unconditional relative branch.

The branch address circuit 36 issues a branch dear signal 112 to the program counter circuit 28 if the branch taken flag of the micro-op indicates that the unconditional relative branch was not taken. The branch address circuit 36 also transfers a target address to the program counter circuit 28 over a target address bus 124 if the branch was erroneously not taken.

The target address on the target address bus 124 specifies the target address for the mispredicted unconditional branch instruction. The program counter circuit 28 uses the target address received over the target address bus 124 to restart the instruction stream.

Figure 4:
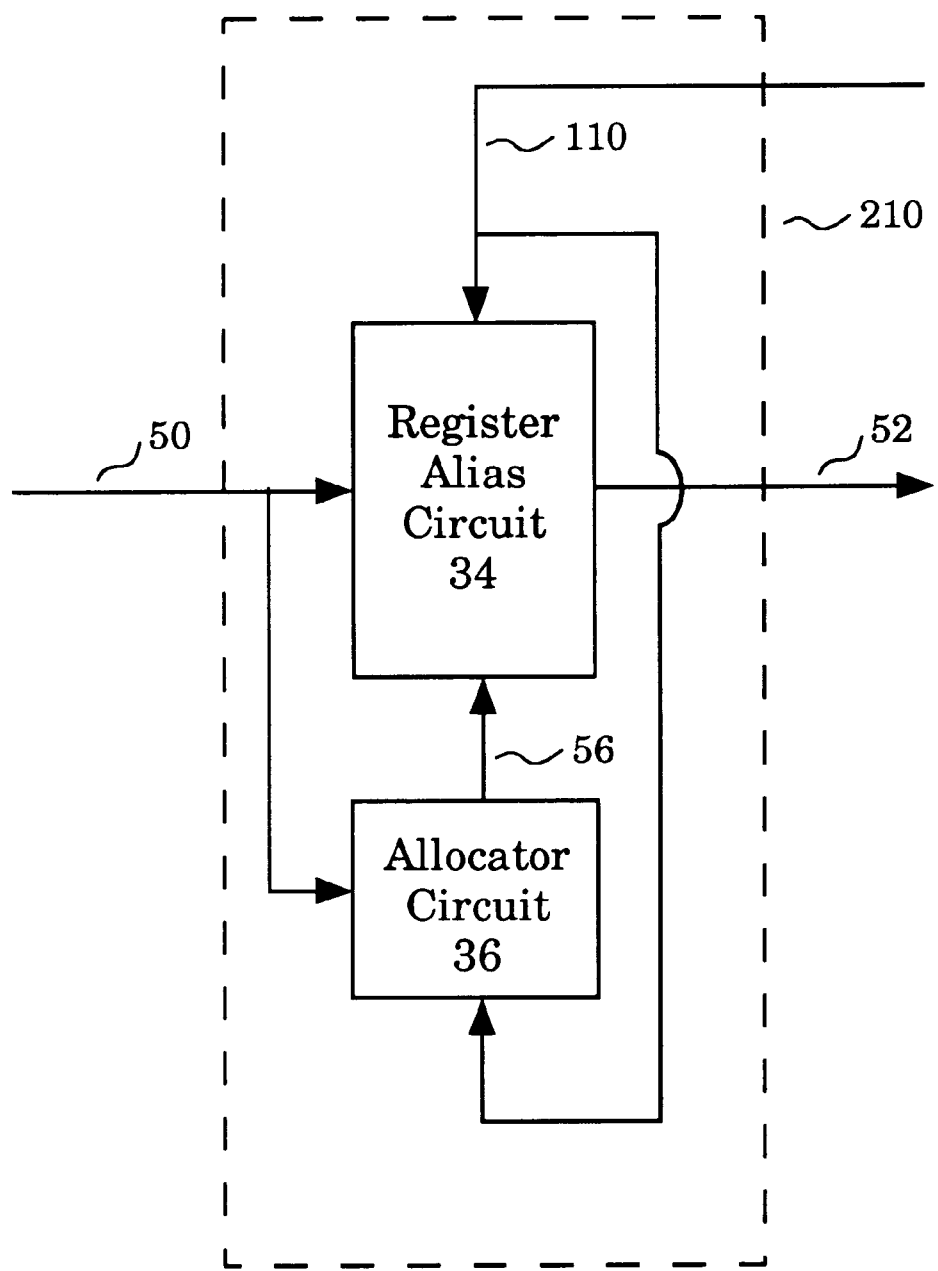
FIG. 4 illustrates the register renaming section comprising a register alias circuit and an allocator circuit.

FIG. 4 illustrates the register renaming section 210 for one embodiment. The register renaming section 210 comprises a register alias circuit 34 and an allocator circuit 36. The register alias circuit 34 contains a register alias table that specifies whether the current state for each architectural register is speculatively held in a physical register in the out-of-order execution pipeline 220 or is retired to a committed state register in the out-of-order execution pipeline 220.

The register alias circuit 34 receives the in-order logical micro-ops over the logical micro-op bus 50, and generates a corresponding set of in-order physical micro-ops by renaming the logical sources and logical destinations of the logical micro-ops. The register alias circuit 34 receives the in-order logical micro-ops over the logical micro-op bus 50, maps the register logical sources and the register logical destination of each logical micro-op into physical sources and a physical destination, and transfers the in-order physical micro-ops over the physical micro-op bus 52.

Each physical micro-op comprises the opcode of the corresponding logical micro-op, a pair of physical sources, a physical destination, and the corresponding logical destination. Each physical source may specify a physical register or provide an immediate data value. The register physical sources of the physical micro-ops specify speculative physical registers and committed state registers in the out-of-order execution pipeline 220. The physical destination of each physical micro-op specifies a physical register in the out-of-order execution pipeline 220 to buffer speculative result data. The logical destination of each physical micro-op identifies an architectural register that corresponds to the physical destination of the physical micro-op.

The allocator circuit 36 tracks the available resources the out-of-order execution pipeline 220. The allocator circuit 36 assigns physical destinations and reservation station entries in the out-of-order execution pipeline 220 to the physical micro-ops on the physical micro-op bus 52.

The allocator circuit 36 transfers the assigned physical destinations to the register alias circuit 34 over a physical destination bus 56. The allocated physical destinations specify physical registers in the out-of-order execution pipeline 220 for buffering speculative results for the physical micro-ops. The allocated physical destinations are used by the register alias circuit 34 to rename the logical destinations of the logical micro-ops into physical destinations.

The allocator circuit 36 assigns the physical registers of the reorder buffer 42 to the physical micro-ops in the same order that logical micro-ops are received over the logical micro-op bus 50. The allocator circuit 36 maintains an allocation pointer for allocating physical registers of in the out-of-order execution pipeline 220.

Figure 5:
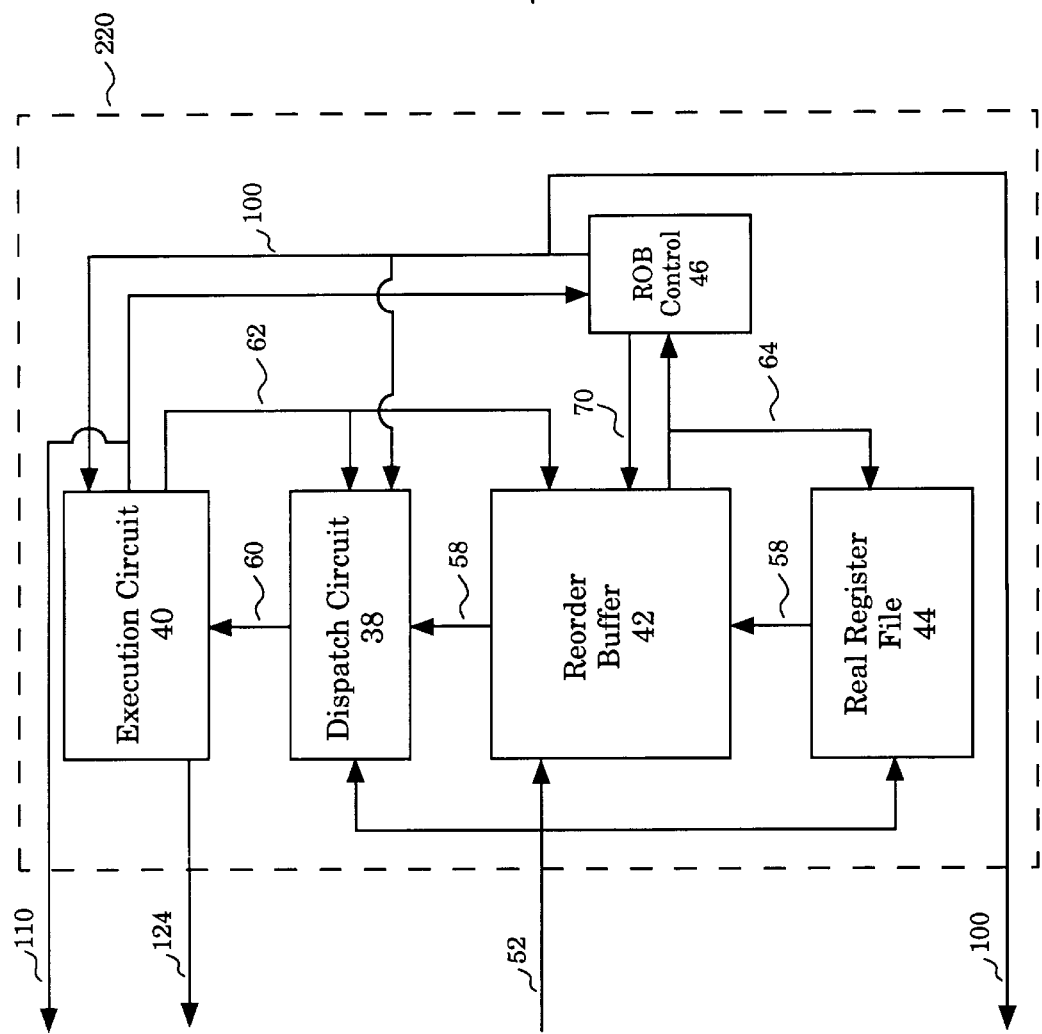
FIG. 5 illustrates the out-of-order execution pipeline which comprises a reorder buffer, a real register file, a reorder buffer (ROB) control circuit, a dispatch circuit, and an execution circuit.

FIG. 5 illustrates the out-of-order execution pipeline 220 for one embodiment. The out-of-order execution pipeline 220 comprises a reorder buffer 42, a real register file 44, a reorder buffer (ROB) control circuit 46, a dispatch circuit 38, and an execution circuit 40.

The dispatch circuit 38 buffers the physical micro-ops awaiting execution by an execution circuit 40. The dispatch circuit 38 receives the physical micro-ops over the physical micro-op bus 52 and stores the physical micro-ops in available reservation station entries. The dispatch circuit 38 assembles source data for the physical micro-ops, and dispatches the physical micro-ops to appropriate execution units in the execution circuit 40 when the source data is assembled and when the appropriate execution unit is available.

The reorder buffer 42 contains the physical registers that buffer speculative results for the physical micro-ops. The physical registers of the reorder buffer 42 buffer integer and floating-point speculative result data.

The real register file 44 contains committed state registers that correspond to the architectural registers of the original stream of instructions. For one embodiment, the committed state registers of the real register file 44 comprise the EAX, EBX, ECX, and EDX registers, etc. and architectural flags, as well as the EIP instruction pointer register of the Intel Architecture Microprocessor.

The reorder buffer 42 and the real register file 44 receive the physical micro-ops over the physical micro-op bus 52. The physical sources of the physical micro-ops specify physical registers in the reorder buffer 42 and committed state registers in the real register file 44 that hold the source data for the physical micro-ops. Each physical source on the physical micro-op bus 52 includes a real register file valid (rrfv) flag that indicates whether the corresponding source data is contained in a physical register in the reorder buffer 42 or a committed state register in the real register file 44.

The reorder buffer 42 reads the source data for the physical sources stored in the reorder buffer 42, and transfers the corresponding source data to the dispatch circuit 38 over a source data bus 58. The real register file 44 reads the source data for the physical sources stored in the real register file 44, and transfers the corresponding source data to the dispatch circuit 38 over the source data bus 58.

The physical destinations of the physical micro-ops on the physical micro-op bus 52 specify physical registers in the reorder buffer 42 for buffering the speculative results of the out-of-order execution of the physical micro-ops. The reorder buffer 42 dears the physical registers specified by the physical destinations. The reorder buffer 42 then stores the logical destination of the physical micro-ops into the physical registers specified by the physical destinations of the physical micro-ops.

The dispatch circuit 38 receives the source data for the pending physical micro-ops from the reorder buffer 42 and the real register file 44 over the source data bus 58. The dispatch circuit 38 also receives source data for the pending physical micro-ops from the execution circuit 40 over a result bus 62 during a write back of speculative results from the execution circuit 40 to the reorder buffer 42.

The dispatch circuit 38 schedules the physical micro-ops having completely assembled source data for execution. The dispatch circuit 38 dispatches the ready physical micro-ops to the execution circuit 40 over a micro-op dispatch bus 60. The dispatch circuit 38 schedules execution of physical micro-ops out-of-order according to the availability of the source data for the physical micro-ops, and according to the availability of execution unit resources in the execution circuit 40.

The execution circuit 40 writes back the speculative results from the out-of-order execution of the physical micro-ops to the reorder buffer 42 over the result bus 62. The writes back of speculative results by the execution circuit 40 is out-of-order due to the out-of-order dispatching of physical micro-ops by the dispatch circuit 38 and the differing number of processor cycles of the processor 12 required for execution of the differing types of physical micro-ops.

For one embodiment, the execution circuit 40 comprises a set of five execution units, and the dispatch circuit 38 dispatches up to five physical micro-ops concurrently to the execution circuit 40 over the micro-op dispatch bus 60.

The execution circuit 40 includes a jump execution unit that executes branch micro-ops. During execution of conditional relative branch micro-ops, the jump execution unit determines whether the branch is taken based upon condition codes generated by the execution of previous micro-ops. The jump execution unit receives the condition codes as source data from the dispatch circuit 38. The jump execution unit determines a branch result indicating whether the branch is taken or not taken. The jump execution unit compares the branch result with the branch taken flag in the opcode.

If the branch result does not agree with the branch taken flag, then the jump execution unit issues the jump execution clear signal 110 to indicate a mispredicted branch. The jump execution unit issues the jump execution clear signal 110 if the branch result indicates not taken and the branch flag of the opcode indicates taken, or if the branch result indicates taken and the branch flag of the opcode indicates not taken.

The jump execution unit determines the correct target address for the mispredicted branch, and transfers the correct target address to the program counter circuit 28 over the target address bus 124 if the branch was erroneously not taken. The target address on the target address bus 124 directs the program counter circuit 28 to the proper location in the instruction cache 24 to restart the instruction stream.

The jump execution unit transfers a branch table pointer over the target address bus 124 if the mispredicted branch was erroneously taken. The branch table pointer directs the program counter circuit 28 to a fall through address in the branch table 22. The specified fall through address specifies the proper location in the instruction cache 24 to restart the instruction stream.

During execution of unconditional indirect branch micro-ops, the jump execution unit determines the correct target address for the branch based upon the source data for the branch micro-op. The jump execution unit also receives the predicted target address for the branch as source data from the dispatch circuit 38. The predicted target address is immediate source data for the branch micro-ops as determined by the branch target circuit 20.

The jump execution unit compares the correct target address with the predicted target address. If the correct target address does not match the predicted target address, then the jump execution unit issues the jump execution clear signal 110 to indicate a mispredicted branch. The jump execution unit transfers the correct target address for the branch to the program counter circuit 28 over the target address bus 124.

The jump execution unit writes back the speculative results from the execution of the branch micro-ops to the reorder buffer 42 over the result bus 62. The jump execution unit writes a branch misprediction flag into the fault field of the corresponding physical destination in the reorder buffer 42 if a mispredicted branch is detected.

The speculative results held in the physical registers of the reorder buffer 42 are committed to an architectural state in the same order as the original logical micro-ops were received. During a retirement operation, the reorder buffer 42 transfers the speculative result data from a sequential set of physical registers to the corresponding committed state registers of the real register file 44 over a retirement bus 64.

The retirement operations are controlled by the ROB control circuit 46. The ROB control circuit 46 signals a retirement operation by transferring a retirement pointer over a retire notification bus 70. The retirement pointer specifies a set of physical registers in the reorder buffer 42 for the retirement operation. For one embodiment, the ROB control circuit 46 retires up to four physical registers during each cycle of the processor 12.

The reorder buffer 42 receives the retirement pointer over the retire notification bus 70, and reads the set of sequential physical registers specified by the retirement pointer. The reorder buffer 42 then transfers the speculative result data from the retiring physical destinations to the real register file 44 over the retirement bus 64.

The register alias circuit 34 and the allocator circuit 36 receive the retirement pointer over the retire notification bus 70. The register alias circuit 34 accordingly updates the register alias table to reflect the retirement. The allocator circuit 36 marks the retired physical registers in the reorder buffer 42 as available for allocation.

During the retirement operation, the ROB control circuit 46 receives the fault data from the retiring physical destinations over the retirement bus 64. If the fault data for one of the retiring physical destinations indicates that a mispredicted branch is being retired, then the ROB control circuit 46 issues the reorder clear signal over the reorder control bus 100 and removes the rename stall signal.

The ROB control circuit 46 issues retire control signals over the retirement bus 64. The retire control signals disable the retirement of the physical destinations that occur after the physical destination of the retiring mispredicted branch. The retire control signals enable the retirement of the mispredicted branch and any of the retiring physical destinations that occur before the retiring mispredicted branch.

The reorder clear signal clears the speculative result data and pending physical micro-ops from the out-of-order execution pipeline 220. The in-order retirement of the mispredicted branch ensures that the remaining unretired micro-ops were generated by the mispredicted branch. The reorder clear signal clears the speculative result data in the reorder buffer 42. The reorder clear signal clears the pending physical micro-ops in the dispatch circuit 38 and the physical micro-ops executing in the execution circuit 40.

The reorder clear signal resets the register renaming section 210 to an appropriate state to receive and process the new in-order stream of logical micro-ops from the front end pipeline 200. The reorder clear signal resets the register alias circuit 34 to map all architectural registers to the corresponding committed state registers in the real register file 44. The reorder clear signal also resets the allocation pointer of the allocator circuit 36 to indicate a cleared reorder buffer 42, and causes deallocation of all the reservation station entries of the dispatch circuit 38.

Figure 6:
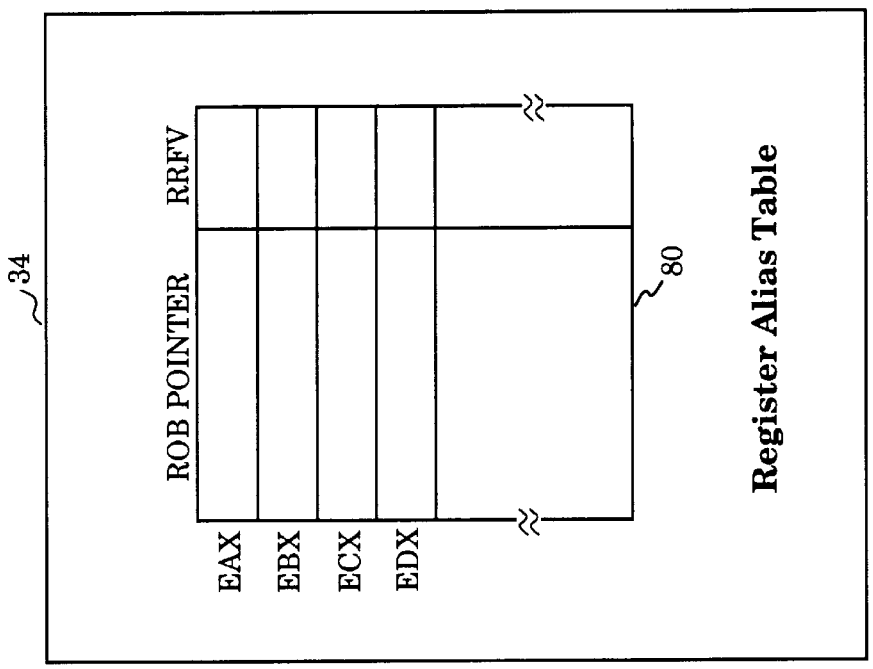
FIG. 6 illustrates a register alias table which enables logical to physical register renaming by mapping the logical sources and destinations to the physical sources and destinations.

FIG. 6 illustrates a register alias table 80 contained in the register alias circuit 34 for one embodiment. The register alias table 80 enables logical to physical register renaming by mapping the logical sources and destinations to the physical sources and destinations. The physical sources and destinations of the physical micro-ops specify physical registers of the reorder buffer 42 and committed state registers of the real register file 44.

The entries in the register alias table 80 correspond to the architectural registers of the original instruction stream. For one embodiment, the EAX, EBX, ECX, and EDX entries of the register alias table 80 correspond to the EAX, EBX, ECX, and EDX registers of the Intel Architecture Microprocessor.

Each entry in the register alias table 80 stores a reorder buffer (ROB) pointer. The ROB pointer specifies a physical register in the reorder buffer 42 that holds the speculative result data for the corresponding architectural register. Each entry in the register alias table 80 also stores a real register file valid (rrfv) flag that indicates whether the speculative result data for the corresponding architectural register has been retired to the appropriate committed state register in the real register file 44.

The register alias circuit receives the in-order logical micro-ops over the logical micro-op bus 50. Each logical micro-op comprises an opcode, a pair of logical sources, and a logical destination. The logical sources and the logical destination each specify an architectural register of the original stream of instructions.

The register alias circuit 34 also receives a set of allocated physical destinations from the allocator circuit 36 over the physical destination bus 56. The physical destinations specify newly allocated physical register destinations in the reorder buffer 42 for the logical micro-ops. The physical registers in the reorder buffer 42 specified by the physical destinations will hold speculative result data for the physical micro-ops corresponding to the logical micro-ops.

The register alias circuit 34 transfers a set of in-order physical micro-ops over the physical micro-op bus 52. Each physical micro-op comprises an opcode, a pair of physical sources and a physical destination. The physical sources each specify a physical register in the reorder buffer 42 or a committed state register in the real register file 44. The physical destination pdst specifies a physical register in the reorder buffer 42 to hold speculative result data for the corresponding physical micro-op.

The register alias circuit 34 generates the physical micro-ops by mapping the logical sources of the logical micro-ops to the physical registers of the reorder buffer 42 and the committed state registers specified of the real register file 44 as specified by the register alias table 80. The register alias circuit 34 merges the physical destinations into the physical destination pdst of the physical micro-ops.

The register alias circuit 34 generates a physical source for a physical micro-op by reading the register alias table 80 entry specified by the corresponding logical source. If the rrfv flag of the specified register alias table 80 entry is not set, then the register alias circuit 34 transfers the ROB pointer from the specified register alias table 80 entry along with the rrfv flag over the physical micro-op bus 52 as the physical source. If the rrfv bit is set, then the register alias circuit 34 transfers a pointer to the committed state register in the real register file 44 that corresponds to the logical source along with the rrfv flag over the physical micro-op bus 52 as the physical source.

The register alias circuit 34 stores the physical destinations from the allocator circuit 36 into the ROB pointer fields of the register alias table 80 entries specified by the logical destinations, and clears the corresponding rrfv bits. The clear rrfv bit indicates that the current state of the corresponding architectural registers are speculatively held in physical registers of the reorder buffer 42 as specified by the corresponding ROB pointers.

During the retirement of a mispredicted branch, the register alias circuit 34 receives the reorder clear signal over the reorder control bus 100. The reorder clear signal causes the register alias circuit 36 to set all the rrfv bits in the register alias table 80 to map all architectural registers to the corresponding committed state registers in the real register file 44.

Figure 7:
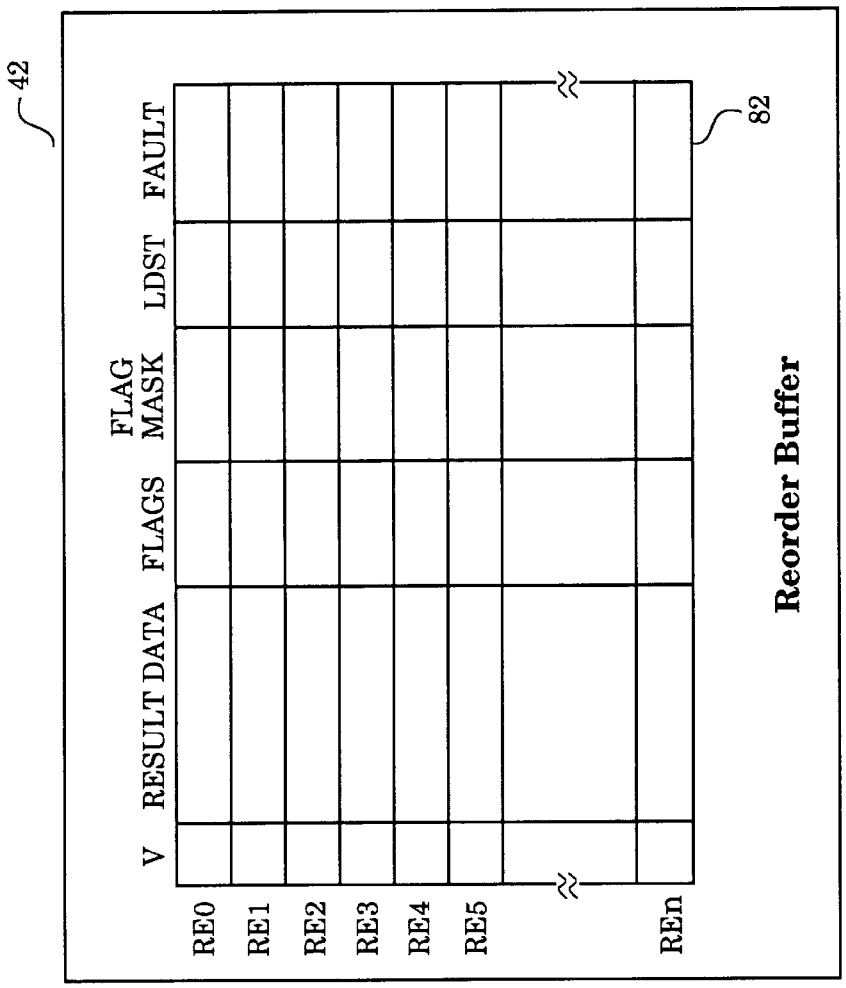
FIG. 7 illustrates the reorder buffer which implements a reorder buffer (ROB) register file comprising a set of ROB entries (RE0 through REn)

FIG. 7 illustrates the reorder buffer 42 for one embodiment. The reorder buffer 42 implements a reorder buffer (ROB) register file 82 comprising a set of ROB entries (RE0 through REn). The ROB entries RE0 through REn are physical registers that buffer speculative result data from the out-of-order execution of physical micro-ops. For one embodiment, the ROB entries RE0 through REn comprise a set of 64 physical registers. For another embodiment that minimizes integrated circuit chip area for the processor 12, the ROB entries RE0 through REn comprise a set of 40 physical registers.

Each ROB entry comprises a valid flag (V), a result data value, a set of flags, a flag mask, a logical destination (LDST), and fault data.

The valid flag indicates whether the result data value for the corresponding ROB entry is valid. The reorder buffer 42 clears the valid flag for each newly allocated ROB entry to indicate an invalid result data value. The valid flag is set when speculative result data is written back to the ROB entry from the execution circuit 40.

The result data value is a speculative result from the out-of-order execution of the corresponding physical micro-op. The result data value may be either an integer data value or a floating-point data value. For one embodiment, the result data value field of each ROB entry RE0 through REn comprises 86 bits to accommodate both integer and floating-point data values.

The flags and flag mask provide speculative architectural flag information. The speculative architectural flag information is transferred to the architectural flags of the real register file 44 upon retirement of the corresponding ROB entry.

The logical destination LDST specifies a committed state register in the real register file 44. The result data value of the corresponding ROB entry is transferred to the committed state register specified by LDST during retirement of the ROB entry.

The fault data contains fault information for the corresponding ROB entry. The fault data includes a branch result flag indicating whether the corresponding ROB entry stores speculative result data from execution of a branch micro-op. The fault data also includes a branch error flag indicating whether the ROB entry corresponds to a branch instruction that was mispredicted by the branch target circuit 20.

The reorder buffer 42 receives the physical micro-ops over the physical micro-op bus 52. The reorder buffer 42 reads the source data specified by the physical micro-ops from the ROB register file 82. The reorder buffer 42 transfers the result data values and the valid flags from the ROB entries specified by the physical sources to the dispatch circuit 38 over the source data bus 58.

The reorder buffer 42 clears the valid bits of the ROB entries specified by the physical destinations of the physical micro-ops received over the physical micro-op bus 52. The reorder buffer 42 clears the valid bits to indicate that the corresponding result data value is not valid until the execution circuit 40 writes back results for the physical micro-ops.

The reorder buffer 42 then stores the logical destinations into the LDST fields of the ROB entries specified by the physical destinations of the physical micro-ops. The logical destination in the LDST field of a ROB entry specifies a committed state register in the real register file 44 for retirement of the corresponding ROB entry.

The reorder buffer 42 receives write back speculative result information from the execution circuit 40 over the result bus 62. Each set of write back speculative result information from the execution circuit 40 comprises a result data value, a physical destination, and fault data.

The reorder buffer 42 stores the write back speculative result information from the execution circuit 40 into the ROB entries specified by the physical destinations on the result bus 62. The reorder buffer 42 stores the result data value into the result data value field, and stores the fault data into the fault data field of the ROB entry specified by the physical destination.

Each result data value from the executions circuit 40 includes a valid flag. Each valid flag is stored into the valid flag of the ROB entry specified by the physical destination. The valid flags of a ROB entry indicates whether the corresponding result data value is valid.

The reorder buffer 42 receives the retiring physical destinations over the retire notification bus 70. The retirement physical destinations cause the reorder buffer 42 to transfer the speculative result data values from the retiring physical destinations to the real register file 44 over the retirement bus 64.

The reorder buffer 42 reads the ROB entries specified by the retirement pointer. The reorder buffer 42 then transfers a set of retiring micro-ops to the real register file 44 over the retirement bus 64. Each retiring micro-op comprises a result data value and a logical destination ldst from one of the retiring ROB entries specified by the retirement pointer. The reorder buffer 42 also transfers the fault data for the retiring ROB entries to the ROB control circuit 46 over the retirement bus 64.

During the retirement of a mispredicted branch, the reorder buffer 42 receives the reorder clear signal over the reorder control bus 100. The reorder dear signal causes the reorder buffer 42 to clear the valid flags for all of the ROB entries.

Figure 8:
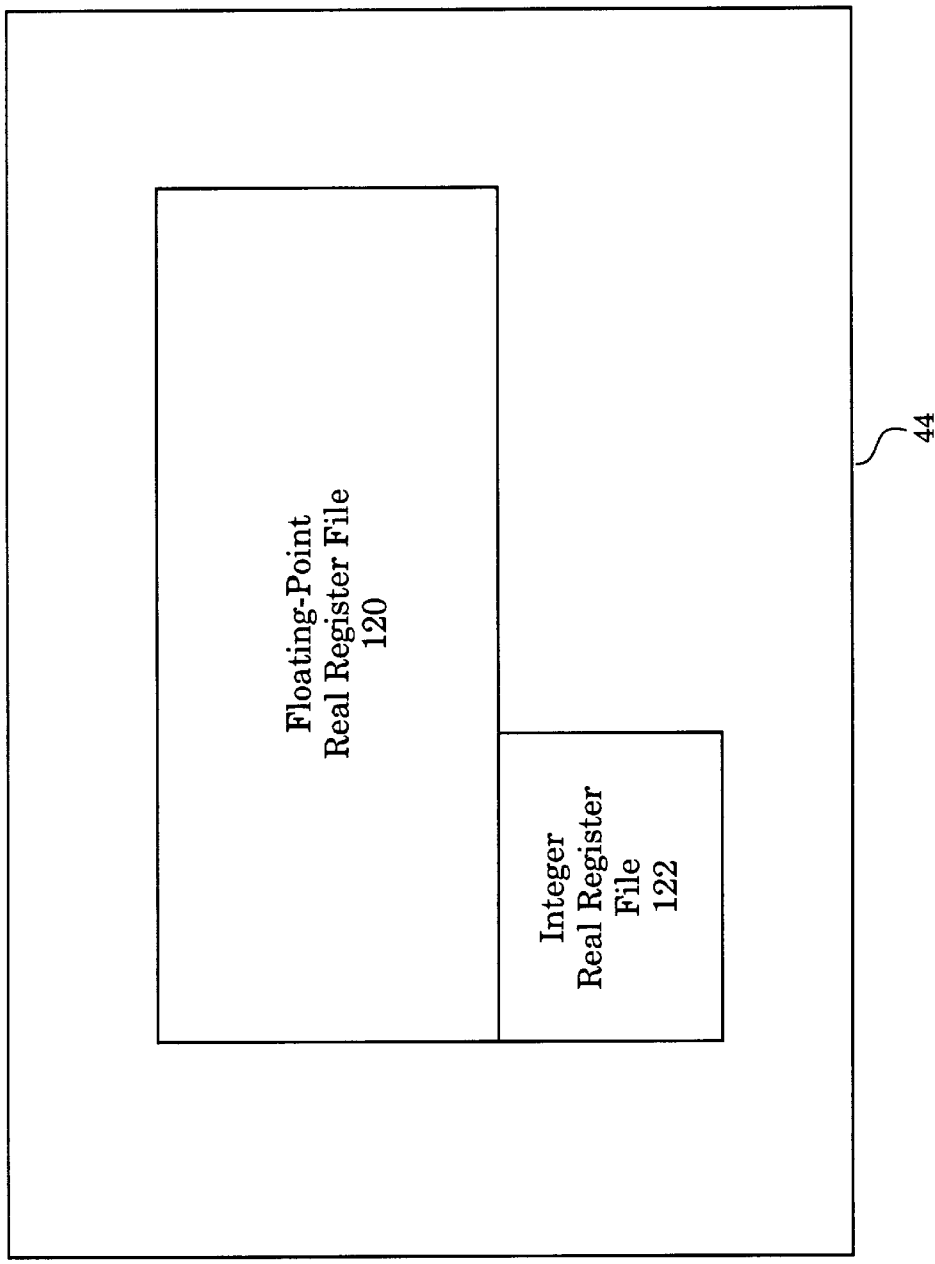
FIG. 8 illustrates the real register file which implements a set of committed state registers that hold committed result data values.

FIG. 8 illustrates the real register file 44 for one embodiment. The real register file 44 implements a set of committed state registers that hold committed result data values. The committed state registers in real register file 44 comprise a floating-point register file 120 and an integer real register file 122. The committed state registers buffer committed results for the architectural registers of the original stream of instructions.

The real register file 44 receives the physical micro-ops over the physical micro-op bus 52. The result data values of the real register files 120 and 122 specified by the physical sources of the physical micro-ops are read if the rrfv flags indicate that the physical sources are retired. The result data values from the specified committed state registers are transferred to the dispatch circuit 38 over the source data bus 58. The source data valid flags from the real register file 44 are always set because the result data in the committed state registers is always valid.

The real register file 44 receives the retiring from the reorder buffer 42 over the retirement bus 64. Each retirement micro-op comprises a result data value and a logical destination. The real register file 44 stores the result data values of the retirement micro-ops into the committed state registers of the real register files 120 and 122 specified by the logical destinations the retirement micro-ops according to the retire control signals from the ROB control circuit 46.

Figure 9:
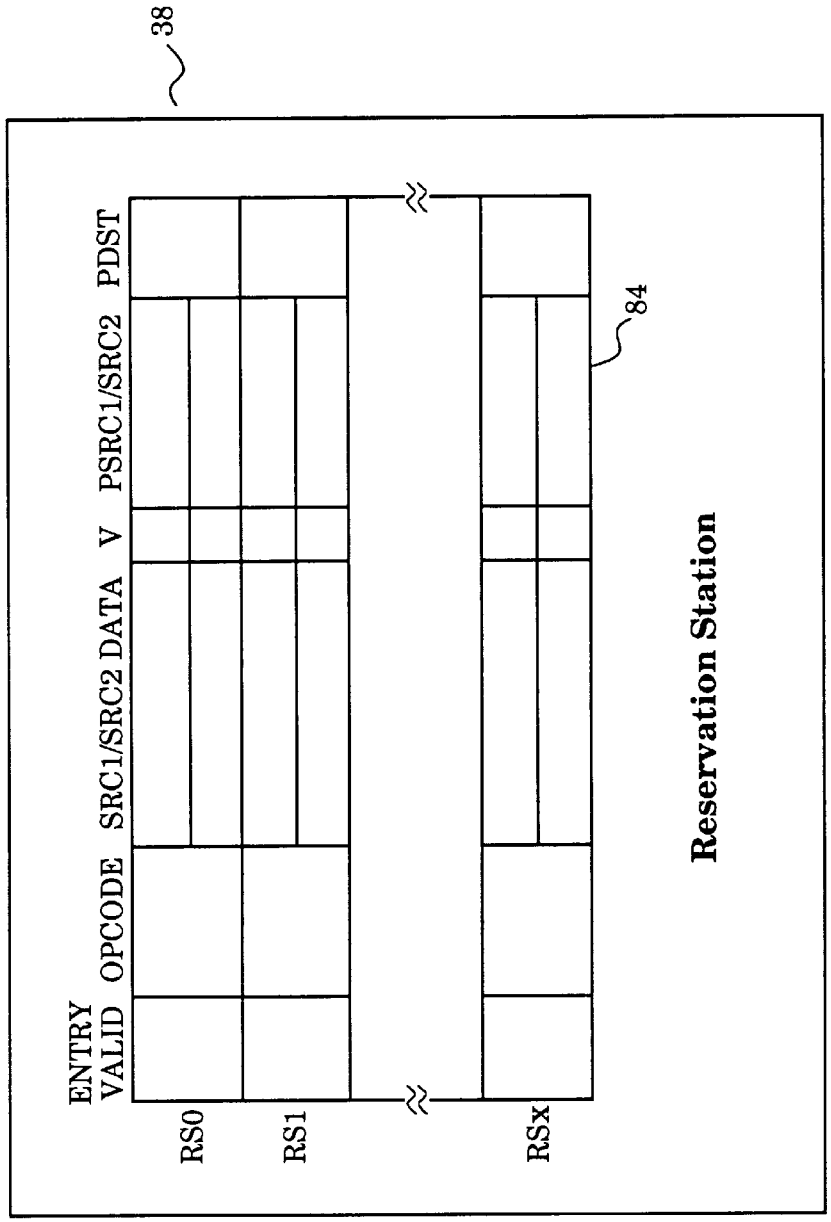
FIG. 9 illustrates the dispatch circuit which implements a dispatch table comprising a set of reservation station entries RS0 through RSx.

FIG. 9 illustrates the dispatch circuit 38 for one embodiment. The dispatch circuit 38 implements a dispatch table 84 comprising a set of reservation station entries RS0 through RSx. The dispatch circuit 38 receives the physical micro-ops on the physical micro-op bus 52, and stores the physical micro-ops into available reservation station entries RS0 through RSx. The dispatch circuit 38 assembles the source data for the physical micro-ops into the reservation station entries RS0 through RSx, and dispatches the ready physical micro-ops to the execution circuit 40. A physical micro-op is ready when the source data is fully assembled in a reservation station entry RS0 through RSx.

Each reservation station entry RS0 through RSx comprises an entry valid flag, an op code, a pair of source data values (SRC1/SRC2 DATA) and corresponding valid flags (V), a pair of physical sources (PSRC1/PSRC2), and a physical destination (PDST).

The entry valid flag indicates whether the corresponding reservation station entry RS0 through RSx holds a physical micro-op awaiting dispatch.

The op code specifies an operation of the execution unit circuit 40 for the physical micro-op in the corresponding reservation station entry RS0 through RSx.

The SRC1/SRC2 DATA fields of the reservation station entries RS0 through RSx hold the source data values for the corresponding physical micro-ops. The corresponding valid flags indicate whether the source data values are valid.

The physical destination PDST of each reservation station entry RS0 through RSx specifies a physical destination in the reorder buffer 42 to hold the speculative results for the corresponding physical micro-op.

The physical sources PSRC1/PSRC2 of each reservation station entry RS0 through RSx specify the physical destinations in the reorder buffer 42 that hold the source data for the corresponding physical micro-op. The dispatch circuit 38 uses the physical sources PSRC1/PSRC2 to detect write back of pending source data from the execution circuit 40 to the reorder buffer 42.

The dispatch circuit 38 receives the physical micro-ops over the physical micro-op bus 52. The dispatch circuit 38 also receives the reservation station entry select signals from the allocator circuit 36. The reservation station entry select signals 66 specify the reservation station entries for the new physical micro-ops.

The dispatch circuit 38 stores the opcode and physical sources psrc1 and psrc2 for each physical micro-op pmop_0 through pmop_3 into the new reservation station entries RS0 through RSx specified by the reservation station entry select signals. The dispatch circuit 38 sets the entry valid flag for each new reservation station entry.

The dispatch circuit 38 receives the source data values and corresponding valid flags specified by the physical sources of the physical micro-ops from the reorder buffer 42 and the real register file 44 over the source data bus 58. The dispatch circuit 38 transfers the source data values and valid flags into the SRC1/SRC2 DATA fields and valid flags of the new reservation station entries corresponding to the physical micro-ops.

If the source data valid flags indicate that one or both of the source data values for a reservation station table entry RS0 through RSx is invalid, then the dispatch circuit 38 waits for the execution circuit 40 to execute previously dispatched physical micro-ops and generate the required source data values.

The dispatch circuit 38 monitors the physical destinations on the result bus 62 as the execution circuit 40 writes back result data values to the reorder buffer 42. If a physical destination on the result bus 62 corresponds to the physical destination of pending source data for a reservation station table entry RS0 through RSx, then the dispatch circuit 38 receives the result data value over the result bus 62 and stores the result data value into the corresponding SRC1/SRC2 DATA fields and valid flags. The dispatch circuit 38 dispatches the pending physical microops to the execution circuit 40 if both source data values are valid.

During the retirement of a mispredicted branch, the dispatch circuit 38 receives the reorder clear signal over the reorder control bus 100. The reorder dear signal causes the dispatch circuit 38 to clear the valid flags for the reservation station entries RS0 through RSx.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded as illustrative rather than a restrictive sense.

What is claimed is:

1. A processor, comprising:

a front end circuit configured to fetch an instruction stream according to a program sequence, wherein the instruction stream includes a first series of instructions, including a branch instruction and at least one instruction prior to the branch instruction in the program sequence, and a second series of instructions, as specified by a branch prediction for the branch instruction;

an out-of-order execution pipeline configured to generate a branch result by executing the branch instruction prior to execution of the at least one instruction of the first series of instructions and to transfer the branch result to the front end circuit if the branch prediction does not match the branch result to redirect the front end circuit to fetch a third series of instructions specified by the branch result while the execution pipeline, subsequent to the execution of branch instruction, continues to execute the at least one instruction and to commit results from execution of instructions in the first series of instructions to an architectural state according to the program sequence; and a control circuit coupled to the front end circuit and configured to prevent the third series of instructions from entering the execution pipeline during execution of the at least one instruction and until the branch result is committed to the architectural state, wherein the control circuit clears instructions in the second series of instructions from the execution pipeline responsive to the commitment of the branch result to the architectural state to ensure the execution pipeline is cleared of the second series of instructions prior to execution of the third series of instructions.

2. The processor of claim 1, wherein the control circuit clears the second series of instructions by clearing at least one execution resource in the execution pipeline allocated to an instruction of the second series of instructions.

3. The processor of claim 1, wherein the control circuit allows the third series of instructions to enter the execution pipeline after the branch result is committed to the architectural state.

4. The processor of claim 3, further comprising a register renaming circuit configured to allocate an execution resource in the execution pipeline to each of the first, second and third series of instructions such that the control circuit prevents the third series of instructions from entering the execution pipeline by disabling the register renaming circuit.

5. The processor of claim 4, wherein the control circuit allows the third series of instructions to enter the execution pipeline by enabling the register renaming circuit.

6. The processor of claim 5, wherein the execution pipeline includes a reorder buffer configured to buffer speculative results from execution of an instructions such that the execution resource comprises a physical register destination in the reorder buffer.

7. The processor of claim 5, wherein the execution pipeline includes a dispatch buffer configured to buffer an instruction during scheduling and dispatch.

8. The processor of claim 1, wherein the front end circuit includes a branch address circuit configured to verify the branch prediction if the branch instruction specifies an unconditional relative branch, the branch address circuit causing the front end circuit to fetch the third series of instructions specified by the branch result if the branch prediction does not match the branch result.

9. The processor of claim 8, wherein the front end circuit further comprises:

an instruction cache to store the first, second and third series of instructions fetched from an external memory over a host bus;

a program counter circuit coupled to the instruction cache to generate a series of instruction addresses that cause the instruction cache to access the first, second and third series of instructions from the instruction cache; and a branch target circuit coupled to the program counter to generate the branch prediction for the branch instruction, the branch target circuit causing the program counter to generate a series of instruction addresses according to the branch prediction.

10. A method for branch misprediction recovery in a processor having an out-of-order execution pipeline, comprising the steps of:

fetching first and second series of instructions as a single instruction stream and according to a program sequence, using a front end circuit, wherein the step of fetching includes the step of fetching the second series of instructions according to a branch prediction for a branch instruction included within the first series of instructions;

generating a branch result by executing the branch instruction in the out-of-order execution pipeline prior to executing at least one instruction, which is included within the first series of instructions and is located prior to the branch instruction in the program sequence;

if the branch prediction does not match the branch result, then redirecting the front end circuit to fetch a third series of instructions specified by the branch result while, subsequent to the execution of the branch instruction, continuing to execute the at least one instruction and to commit results from execution of instructions in the first series of instructions to an architectural state according to the program sequence;

stalling the third series of instructions from execution during execution of the at least one instruction and prior to the branch result being committed to the architectural state;

detecting commitment of the branch result to the architectural state; and clearing, from the execution pipeline of the processor, instructions in the second series of instructions responsive to the commitment of the branch result to the architectural state to ensure clearing of the second series of instructions from the execution pipeline prior to execution of the third series of instructions.

11. The method of claim 10, wherein the step of clearing the second series of instructions comprises the step of clearing at least one execution resource in the processor allocated to an instruction of the second series of instructions.

12. The method of claim 10, further comprising the step of allowing the third series of instructions to execute after the branch result is committed to the architectural state.

13. The method of claim 12, wherein the step of stalling the third series of instructions from execution comprises the step of stalling allocation of an execution resource to an instruction of the third series of instructions.

14. The method of claim 13, wherein the step of allowing the third series of instructions to execute comprises the step of resuming allocation of the execution resource to an instruction of the third series of instructions.

15. The method of claim 14, wherein the execution resource comprises a physical register destination in a reorder buffer that buffers speculative results from the execution of an instruction.

16. The method of claim 14, wherein the execution resource comprises an entry in the dispatch buffer that buffers an instruction during scheduling and dispatch.

17. An apparatus for branch misprediction recovery in a processor having an out-of-order execution capability, the apparatus comprising:

means for fetching first and second series of instructions, according to a program sequence and as a single instruction stream, using a front end circuit, wherein the means for fetching fetches the second series of instructions according to a branch prediction for a branch instruction included within the first series of instructions;

means for generating a branch result by performing an out-of-order execution of the branch instruction prior to executing at least one instruction included within the first series of instructions and located prior to the branch instruction in the program sequence;

means for fetching a third series of instructions according to the branch result while the processor, subsequent to the out-of-order execution of the branch instruction, continues to perform the out-of-order execution of instructions in the first series of instructions including said at least one instruction and to commit results from execution of instructions in the first series of instructions to an architectural state according to the program sequence if the branch prediction does not match the branch result;

means for stalling the third series of instructions from execution during execution of the at least one instruction and prior to the branch result being committed to the architectural state; and means for clearing the second series of instructions from the processor responsive to commitment of the branch result to the architectural state to ensure clearing of the second series of instructions from the processor prior to execution of the third series of instructions.

18. The apparatus of claim 17, wherein the means for clearing the second series of instructions comprises means for clearing at least one execution resource in the processor allocated to an instruction of the second series of instructions.

19. The apparatus of claim 17, further comprising means for allowing the third series of instructions to execute after the branch result is committed to the architectural state.

20. The apparatus of claim 18, wherein the means for stalling the third series of instructions from execution comprises means for stalling allocation of the execution resource to an instruction of the third series of instructions.

21. The apparatus of claim 18, wherein the means for allowing the third series of instructions to execute comprises means for resuming allocation of the execution resource to an instruction of the third series of instructions.

22. The apparatus of claim 21, wherein the execution resource comprises a physical register destination in a reorder buffer that buffers speculative results from execution of an instructions.

23. The apparatus of claim 21, wherein the execution resource comprises an entry in the dispatch buffer that buffers an instruction during scheduling and dispatch.

* * * * *

UNITED STATES PATENT AND TRADEMARK OFFICE
CERTIFICATE OF CORRECTION

PATENT NO. : 6,079,014
DATED : June 20, 2000
INVENTOR(S) : Papworth et al.

It is certified that error appears in the above-identified patent and that said Letters Patent is hereby corrected as shown below:

Column 3,
Line 6, delete "dear" and insert -- clear --.

Column 7,
Line 59, delete "dear" and insert -- clear --.

Column 14,
Line 22, delete "microops" and insert -- micro-ops --.

Signed and Sealed this

Eighth Day of January, 2002

Attest:

*Attesting Officer*

JAMES E. ROGAN
*Director of the United States Patent and Trademark Office*